United States Patent
Takahata

(10) Patent No.: US 12,117,612 B2
(45) Date of Patent: Oct. 15, 2024

(54) DISPLAY SYSTEM

(71) Applicant: Japan Display Inc., Tokyo (JP)

(72) Inventor: Masashi Takahata, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/243,870

(22) Filed: Sep. 8, 2023

(65) Prior Publication Data

US 2023/0418058 A1 Dec. 28, 2023

Related U.S. Application Data

(63) Continuation of application No. PCT/JP2022/002069, filed on Jan. 20, 2022.

(30) Foreign Application Priority Data

Mar. 11, 2021 (JP) ................... 2021-039664

(51) Int. Cl.
*G02B 27/01* (2006.01)
*G02F 1/133* (2006.01)
(Continued)

(52) U.S. Cl.
CPC ..... *G02B 27/0101* (2013.01); *G02F 1/13306* (2013.01); *G09G 3/002* (2013.01); *G09G 3/36* (2013.01); *G09G 2310/08* (2013.01); *G09G 2320/041* (2013.01); *G09G 2330/045* (2013.01); *G09G 2380/10* (2013.01)

(58) Field of Classification Search
CPC ..... G09G 3/36–3696; G09G 2320/041; G09G 2330/04–045
See application file for complete search history.

(56) References Cited

U.S. PATENT DOCUMENTS 9,753,283 B2 9/2017 Nambara
10,043,456 B1 * 8/2018 de Greef ............ G09G 3/3406
(Continued)

FOREIGN PATENT DOCUMENTS

JP 2004191946 A 7/2004
JP 2005227485 A 8/2005
(Continued)

OTHER PUBLICATIONS

International Search Report from corresponding PCT application PCT/JP2022/002069, dated Mar. 22, 2022.

*Primary Examiner* — Patrick F Marinelli
(74) *Attorney, Agent, or Firm* — K&L Gates LLP

(57) ABSTRACT

According to an aspect, a display system includes: a display apparatus; and a mirror apparatus configured to reflect an image from the display apparatus and project the image on a projection plate. The mirror apparatus includes: a region configured to reflect the image and divided into a plurality of partial regions; a temperature sensor configured to detect a temperature of each of the partial regions; a liquid crystal mirror disposed facing the temperature sensor and configured to be switched between a reflective state in which incident light is reflected and a transmissive state in which incident light is transmitted; and a control circuit configured to control the reflective state and the transmissive state in each of the partial regions depending on the temperature detected in the partial region.

9 Claims, 10 Drawing Sheets

(51) Int. Cl.
*G09G 3/00* (2006.01)
*G09G 3/36* (2006.01)

(56) References Cited

U.S. PATENT DOCUMENTS

| | | | |
|---|---|---|---|
| 11,644,700 B2* | 5/2023 | Takahata | G02F 1/133626 |
| | | | 349/33 |
| 11,659,147 B2* | 5/2023 | Aoki | G03B 21/006 |
| | | | 353/31 |
| 11,906,829 B2* | 2/2024 | Takahata | G02B 27/0101 |
| 11,998,898 B1* | 6/2024 | Koseoglu | B01J 29/89 |
| 2005/0234348 A1 | 10/2005 | Watanabe et al. | |
| 2018/0059431 A1 | 3/2018 | Yang et al. | |
| 2019/0346674 A1 | 11/2019 | Miyake et al. | |
| 2020/0027406 A1* | 1/2020 | Kanazawa | G09G 3/36 |
| 2022/0159224 A1* | 5/2022 | Aoki | H04N 9/3111 |
| 2023/0054267 A1* | 2/2023 | Takahata | G02F 1/133536 |
| 2023/0418058 A1* | 12/2023 | Takahata | G02F 1/13306 |

FOREIGN PATENT DOCUMENTS

| | | | |
|---|---|---|---|
| JP | 2015210328 A | 11/2015 | |
| JP | 2020067650 A | 4/2020 | |
| JP | 2021026097 A | 2/2021 | |

* cited by examiner

DISPLAY SYSTEM

CROSS-REFERENCE TO RELATED APPLICATION

This application claims the benefit of priority from Japanese Patent Application No. 2021-039664 filed on Mar. 11, 2021 and International Patent Application No. PCT/JP2022/002069 filed on Jan. 20, 2022, the entire contents of which are incorporated herein by reference.

BACKGROUND

1. Technical Field

What is disclosed herein relates to a display system.

2. Description of the Related Art

Widely known are what is called head-up displays (HUDs) that project images on a translucent member, such as glass.

Sunlight may possibly be incident on a display apparatus via an optical system. If the sunlight condensed by the optical system is incident on the display apparatus, the area on which the light is incident may have a high temperature and adversely affect the display apparatus. Therefore, it is necessary to limit the incidence of sunlight, which is a cause of temperature rise.

For the foregoing reasons, there is a need for a display system that can limit incidence of sunlight and suppress temperature rise in a display apparatus.

SUMMARY

According to an aspect, a display system includes: a display apparatus; and a mirror apparatus configured to reflect an image from the display apparatus and project the image on a projection plate. The mirror apparatus includes: a region configured to reflect the image and divided into a plurality of partial regions; a temperature sensor configured to detect a temperature of each of the partial regions; a liquid crystal mirror disposed facing the temperature sensor and configured to be switched between a reflective state in which incident light is reflected and a transmissive state in which incident light is transmitted; and a control circuit configured to control the reflective state and the transmissive state in each of the partial regions depending on the temperature detected in the partial region.

DETAILED DESCRIPTION

Figure 1:
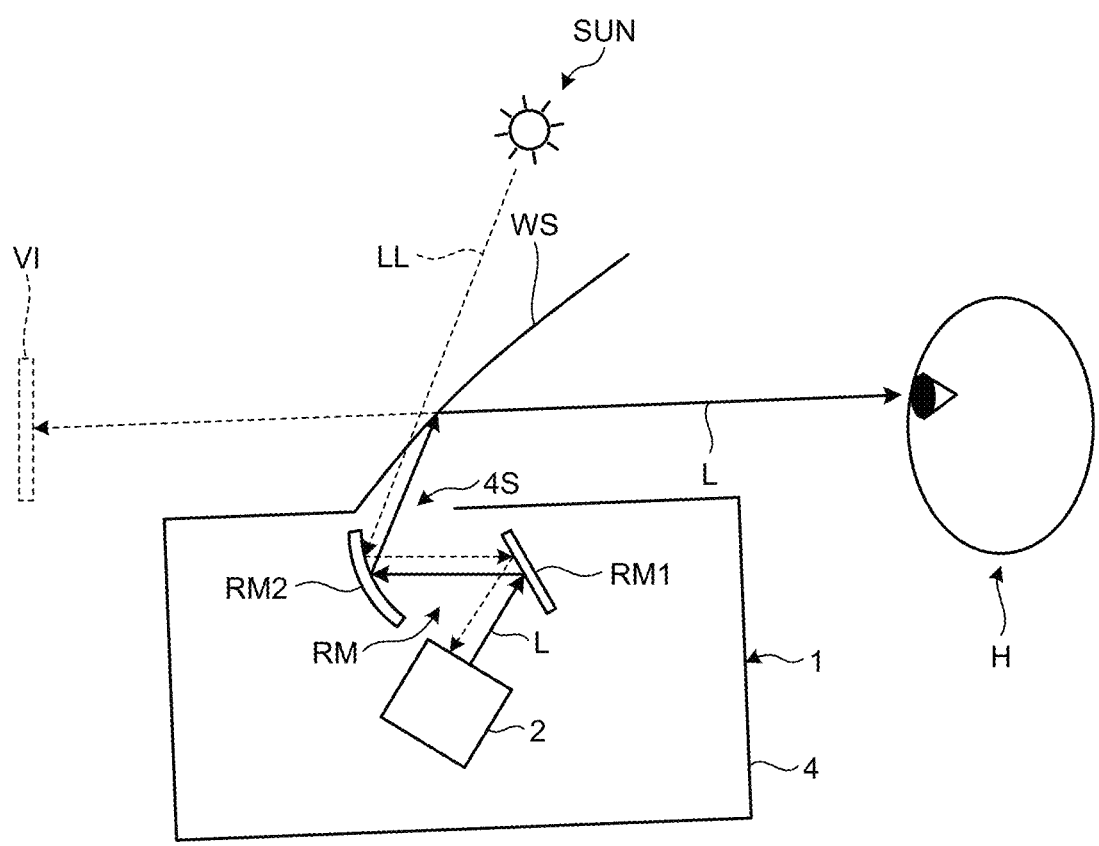
FIG. 1 is a schematic for explaining a display system according to an embodiment.

Exemplary aspects (embodiments) to embody the present disclosure are described below in greater detail with reference to the accompanying drawings. Contents described in the following embodiments do not limit the present disclosure. Components described below include those that can be easily assumed by those skilled in the art and substantially the same components. Furthermore, the components described below can be appropriately combined. What is disclosed herein is merely an example, and it is needless to say that appropriate modifications within the gist of the disclosure at which those skilled in the art can easily arrive are encompassed in the scope of the present disclosure. In the drawings, widths, thicknesses, shapes, and the like of the components can be schematically illustrated in comparison with actual modes for clearer explanation. They are, however, merely examples and do not limit interpretation of the present disclosure. In the present specification and the drawings, the same reference numerals denote components similar to those described before with reference to the drawing that has already been referred to, and detail explanation thereof can be appropriately omitted.

In this disclosure, when an element is described as being "on" another element, the element can be directly on the other element, or there can be one or more elements between the element and the other element.

FIG. 1 is a schematic for explaining a display system according to an embodiment. A display system 1 according to the embodiment is a head-up display (HUD, which is hereinafter referred to simply as a "HUD 1") as illustrated in FIG. 1, for example. The HUD 1 includes a display apparatus 2, an optical system RM, and a housing 4. The optical system RM reflects an image from the display apparatus 2 and projects it on a projection plate WS. The housing 4 houses the display apparatus 2 and the optical system RM.

The display apparatus 2 is a liquid crystal display apparatus that transmits light emitted from a light source through a liquid crystal display panel to project it as an image, for example. The display apparatus 2 is not limited to a liquid crystal display apparatus and may be a self-emitting display panel, such as an organic EL display including organic light-emitting diodes (OLEDs) as display elements and a micro LED (PLED) display.

Light L of an image output from the display apparatus 2 is reflected by the optical system RM including a mirror apparatus RM1 and a mirror member RM2, is guided to and reflected by the projection plate WS, and reaches a user H. As a result, the light L is recognized as an image VI in the field of view of the user H. The projection plate WS simply needs to be a light-transmitting member positioned on the line of sight of the user H. The projection plate WS is a front window of a vehicle, a windshield, or a light-transmitting plate member called a combiner provided separately from the front window, for example.

As illustrated in FIG. 1, sunlight LL may be incident on the HUD 1 through an opening 4S of the housing 4 depending on a relative position of the sun SUN. The sunlight LL may be guided by the optical system RM and condensed toward the display apparatus 2. The condensed sunlight may possibly cause anomalies in the display apparatus 2 in operation. Therefore, it is desired to limit the incidence of the sunlight LL on the display apparatus 2 and suppress partial temperature rise in a display region.

Figure 2A:
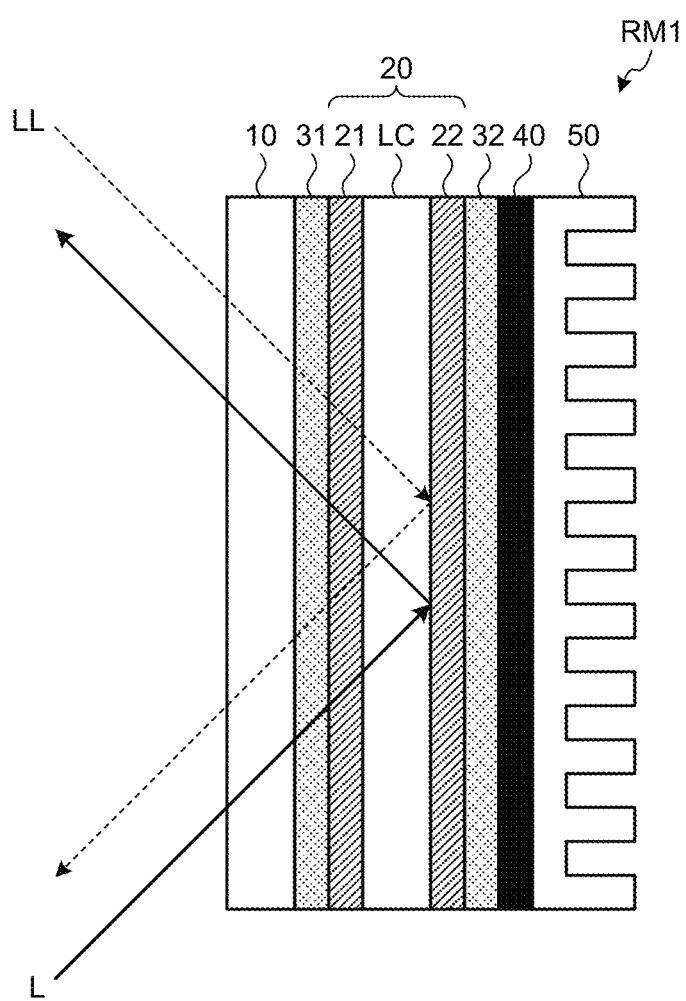
FIG. 2A is a sectional view of the configuration of a mirror apparatus.
Figure 2B:
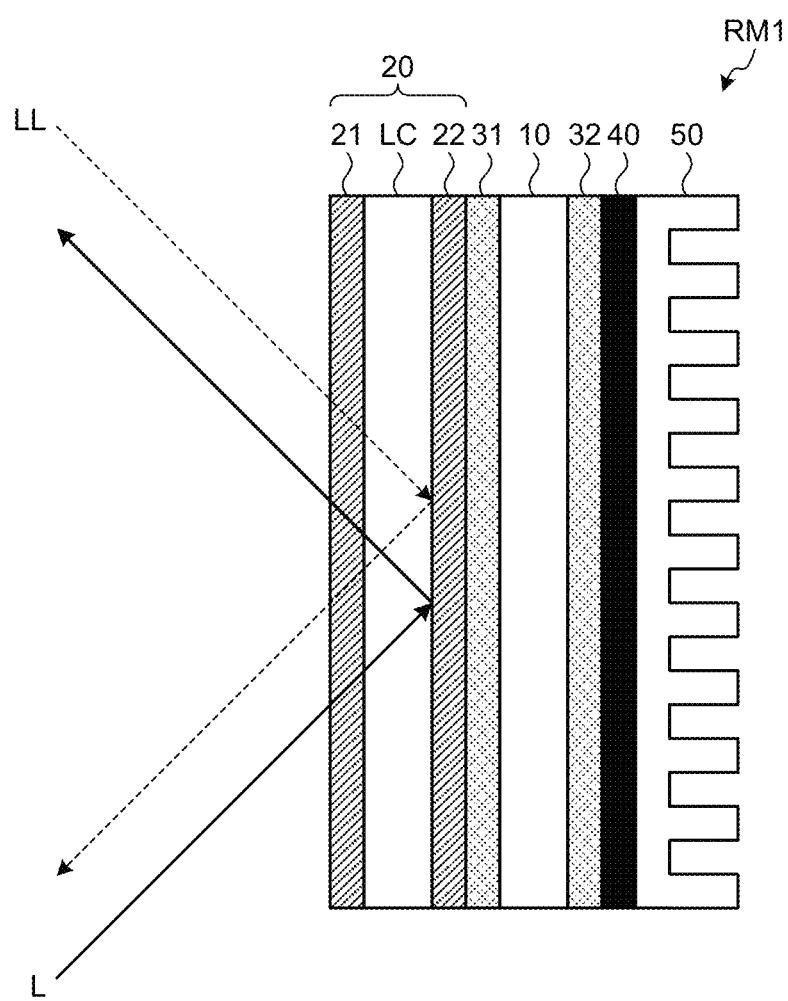
FIG. 2B is another sectional view of the configuration of the mirror apparatus.

FIGS. 2A and 2B are sectional views of the configuration of the mirror apparatus. The mirror apparatus RM1 includes a temperature sensor 10 and a liquid crystal mirror 20. As illustrated in FIG. 2A, the temperature sensor 10 may be provided on the surface side on which the light L of an image output from the display apparatus 2 or the sunlight LL is incident (hereinafter referred to simply as an "incident surface side"), and the liquid crystal mirror 20 may be provided on the back side of the temperature sensor 10 with a first transparent insulating layer 31 interposed therebetween. Alternatively, as illustrated in FIG. 2B, the liquid crystal mirror 20 may be provided on the incident surface side, and the temperature sensor 10 may be provided on the back side of the liquid crystal mirror 20 with the first transparent insulating layer 31 interposed therebetween.

In the example illustrated in FIG. 2A, an absorption layer 40 is provided on the back side of the liquid crystal mirror 20 with a second transparent insulating layer 32 interposed therebetween, and a heat dissipation layer 50 is provided on the back side of the absorption layer 40. In the example illustrated in FIG. 2B, the absorption layer 40 is provided on the back side of the temperature sensor 10 with the second transparent insulating layer 32 interposed therebetween, and the heat dissipation layer 50 is provided on the back side of the absorption layer 40. The absorption layer 40 is made of organic or inorganic material colored in black, for example. The heat dissipation layer 50 is a heat sink or a heat dissipation sheet, for example.

As illustrated in FIGS. 2A and 2B, the liquid crystal mirror 20 includes a first polarizing plate 21 and a second polarizing plate 22 with a liquid crystal layer LC interposed therebetween. The light L of the image output from the display apparatus 2 passes through the first polarizing plate 21 and the liquid crystal layer LC, is reflected by the second polarizing plate 22, and passes through the liquid crystal layer LC and the first polarizing plate 21. The sunlight LL passes through the first polarizing plate 21 and the liquid crystal layer LC, is reflected by the second polarizing plate 22, and passes through the liquid crystal layer LC and the first polarizing plate 21.

The temperature sensor 10 may be separated from the liquid crystal mirror 20 or may be in contact with or bonded to the liquid crystal mirror 20. The temperature sensor 10 may be integrated with the liquid crystal mirror 20.

Figure 3:
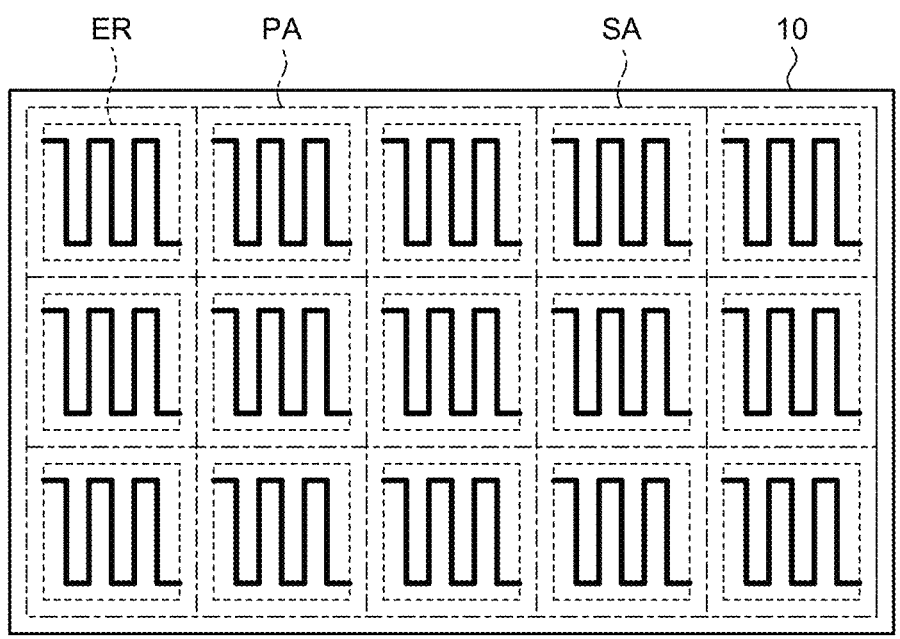
FIG. 3 is a plan view of a temperature sensor.
Figure 3:
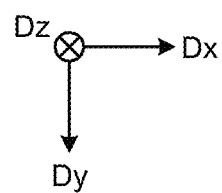
Figure 4:
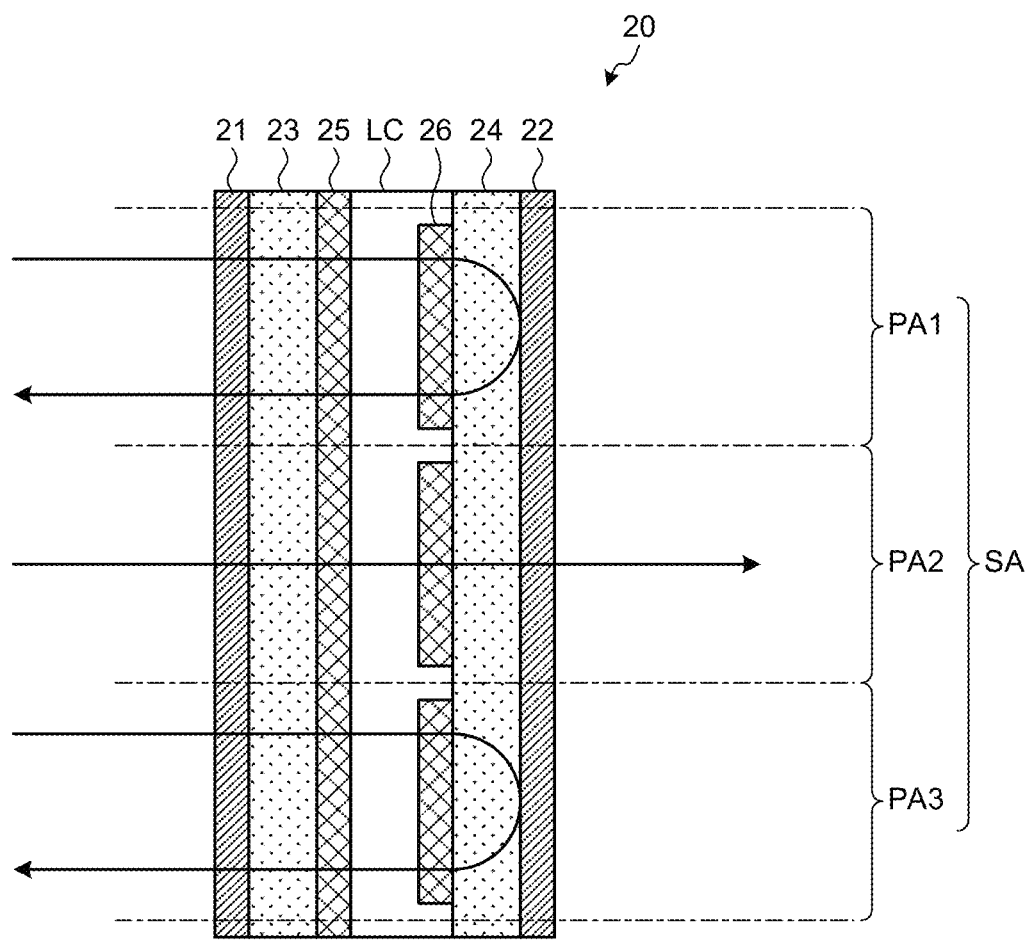
FIG. 4 is a schematic of an example of a sectional structure of a liquid crystal mirror.
Figure 5:
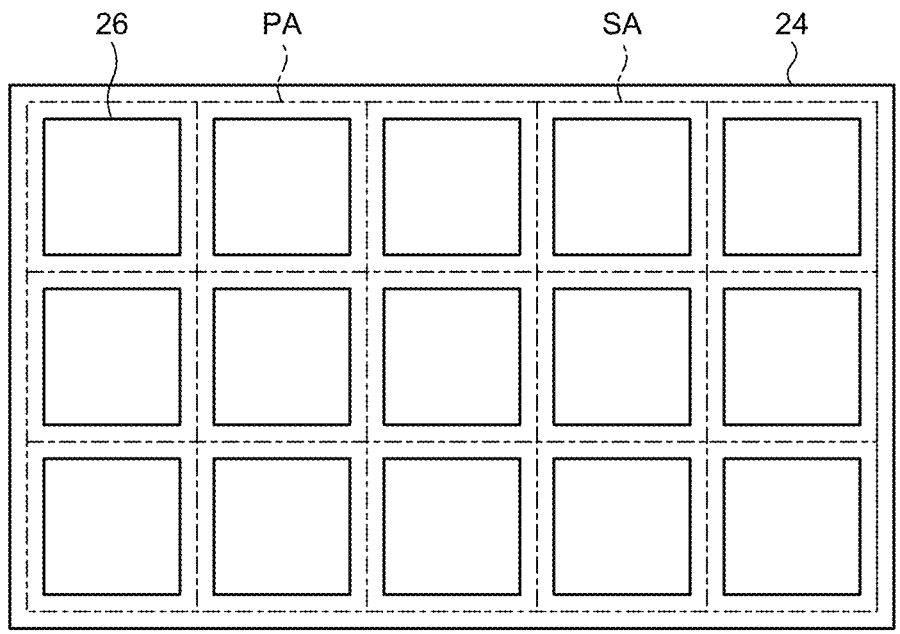
FIG. 5 is a plan view of the arrangement of second electrodes in the liquid crystal mirror.
Figure 5:
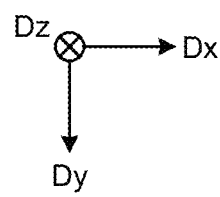

FIG. 3 is a plan view of the temperature sensor. FIG. 4 is a schematic of an example of a sectional structure of the liquid crystal mirror. FIG. 5 is a plan view of the arrangement of second electrodes in the liquid crystal mirror.

In the mirror apparatus RM1, a region SA that is configured to reflect the light L of the image output from the display apparatus 2 is divided into a plurality of partial regions PA. The region SA in the mirror apparatus RM1 is a region corresponding to the display region of the display apparatus 2. The temperature sensor 10 detects the temperature of the partial regions PA.

As illustrated in FIG. 3, the partial regions PA on the temperature sensor 10 are regions provided with respective temperature detection resistance elements ER. While FIG. 3 illustrates a total of 15 partial regions PA with five partial regions PA arrayed in a first direction Dx and three partial regions PA arrayed in a second direction Dy, the number of partial regions PA is not limited thereto. For example, the temperature sensor 10 may be composed of a total of 12 partial regions PA with four partial regions PA arrayed in the first direction Dx and three partial regions PA arrayed in the second direction Dy.

The first direction Dx is one direction in a plane parallel to the substrate of the temperature sensor 10. The second direction Dy is one direction in the plane parallel to the substrate of the temperature sensor 10 and orthogonal to the first direction Dx. The second direction Dy may intersect the first direction Dx without being orthogonal thereto. A third direction Dz is a direction orthogonal to the first direction Dx and the second direction Dy, and is the normal direction of the substrate of the temperature sensor 10.

The temperature detection resistance element ER is an electrical resistance element made of alloy, compound containing metal (metal compound), or metal, as material. The resistance element ER may be a multilayered structure composed of a plurality of types of materials corresponding to at least one of metal, alloy, and metal compound. In the description of the embodiment, alloy or the like refers to material that can be employed as the composition of the resistance element ER. In the temperature detection resistance element ER in the example illustrated in FIG. 3, a plurality of L-shaped wiring lines with the long side extending along the second direction Dy are coupled in the first direction Dx. In this aspect, a plurality of L-shaped wiring lines are coupled to form the temperature detection resistance element ER such that the short sides of respective two L-shaped wiring lines adjacently disposed in the first direction Dx are alternately disposed in the second direction Dy.

The temperature sensor 10 includes a plurality of reference resistance elements RR coupled in series to the temperature detection resistance elements ER and constitute respective temperature sensing elements (refer to FIG. 6), for example. The reference resistance elements RR are provided in the region outside the region SA, for example. The present disclosure is not limited by the arrangement form of the reference resistance elements RR.

Figure 6:
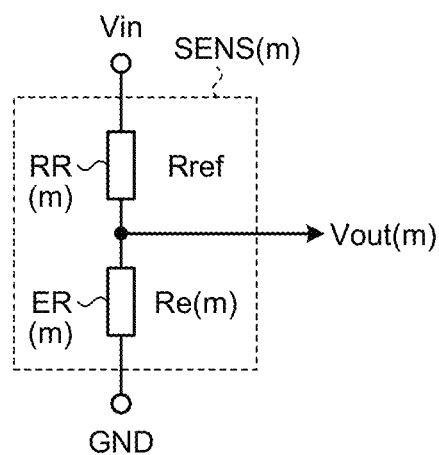
FIG. 6 is a configuration diagram of a temperature sensing element.

FIG. 6 is a configuration diagram of the temperature sensing element. FIG. 6 illustrates a temperature sensing element SENS(m) corresponding to the m-th (m is an integer from 1 to M) partial region PA(m) out of M (M is 15 in the example illustrated in FIG. 3) partial regions PA.

As illustrated in FIG. 6, the temperature sensing element SENS(m) is composed of the reference resistance element RR(m) and the temperature detection resistance element ER(m) electrically coupled in series between an input potential Vin and a reference potential GND. The temperature sensing element SENS(m) outputs an output potential Vout(m) corresponding to the volume resistivity of the temperature detection resistance element ER(m). In other words, the potential at the coupling point between the temperature detection resistance element ER(m) and the reference resistance element RR(m) is output as the output potential Vout(m) of the temperature sensing element SENS(m).

In the temperature sensing element SENS(m), the flow of an electric current generated corresponding to the input potential Vin to the reference potential GND is blocked by the volume resistivity of the temperature detection resistance element ER(m), thereby generating an electric current. This electric current generates the output potential Vout(m). In other words, the output potential Vout(m) increases as the volume resistivity of the temperature detection resistance element ER(m) increases.

When the resistance of the reference resistance element RR(m) is Rref, and the resistance of the temperature detection resistance element ER(m) is Re(m), the output potential Vout(m) of the temperature sensing element SENS(m) is expressed by the following Expression (1):

$$\text{Vout}(m)=[\text{Re}(m)+\text{Rref}]\times \text{Vin} \quad (1)$$

Temperature T(m) detected by the temperature sensing element SENS(m) is expressed by the following Expression (2):

$$T(m)=[\text{Rref}/(\text{Vin}/\text{Vout}(m))-1)]\times a(m)+b(m) \quad (2)$$

In Expression (2), a first coefficient a(m) and a second coefficient b(m) are characteristic values to compensate for the electrical characteristic variations of the temperature detection resistance element ER(m) and each coefficient is a different value depending on each temperature detection resistance element ER(m). Therefore, to calculate the temperature of each partial region PA detected by the temperature sensing element SENS(m), a different first coefficient a(m) and a different second coefficient b(m) are used for each temperature detection resistance element ER(m) of the temperature sensing element SENS(m). As a result, the accuracy of temperature calculation results can be improved.

As illustrated in FIG. 4, the liquid crystal mirror 20 includes a first substrate 23, a second substrate 24, a first electrode 25, and second electrodes 26. The first electrode 25 and the second electrodes 26 are provided facing each other in the third direction Dz with the liquid crystal layer LC interposed therebetween. The first electrode 25 is provided on the first substrate 23. The second electrodes 26 are provided on the second substrate 24.

The liquid crystal mirror 20 is disposed facing the temperature sensor 10 in the third direction Dz. As illustrated in FIG. 5, the partial regions PA on the liquid crystal mirror 20 are regions provided with the respective second electrodes 26 on the second substrate 24. The liquid crystal mirror 20 reflects or transmits light incident thereon by controlling the potential difference between the first electrode 25 and the second electrode 26.

Specifically, as illustrated in FIG. 4, when no potential difference is applied between the first electrode and the second electrode 26, for example, light incident on the partial regions PA1 and PA3 each provided with the second electrode 26 is reflected by the liquid crystal mirror 20.

As illustrated in FIG. 4, when a predetermined potential difference is applied between the first electrode and the second electrode 26, for example, light incident on the partial region PA2 provided with the second electrode 26 is transmitted through the liquid crystal mirror 20. The light transmitted through the liquid crystal mirror 20 is absorbed by the absorption layer 40 illustrated in FIGS. 2A and 2B. Heat accumulated in the absorption layer 40 by the light transmitted through the liquid crystal mirror 20 is dissipated by the heat dissipation layer 50.

The liquid crystal mirror 20 simply needs to reflect or transmit light incident thereon by controlling the potential difference between the first electrode 25 and the second electrode 26, and it is not limited to the aspect described above. When a predetermined potential difference is applied between the first electrode 25 and the second electrode 26, for example, light incident on the partial regions PA1 and PA3 each provided with the second electrode 26 may be reflected by the liquid crystal mirror 20. When no potential difference is applied between the first electrode 25 and the second electrode 26, light incident on the partial region PA2 provided with the second electrode 26 may be transmitted through the liquid crystal mirror 20. The present disclosure is not limited by the control manner of the liquid crystal mirror 20.

While FIGS. 4 and 5 illustrate an example where one second electrode 26 is provided corresponding to one partial region PA, a plurality of second electrodes 26 may be provided corresponding to one partial region PA.

Figure 7:
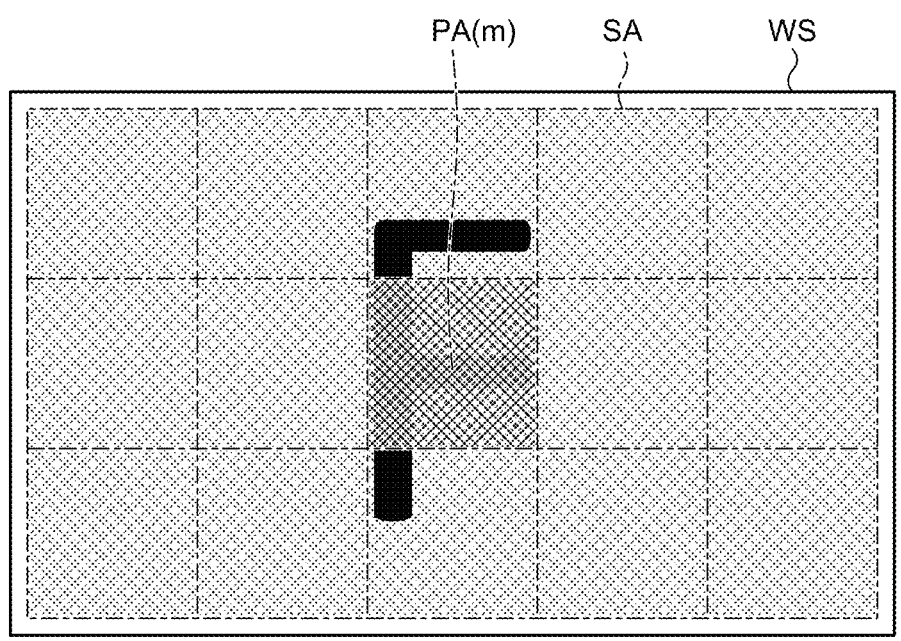
FIG. 7 is a schematic for explaining a specific example of an operation of the mirror apparatus.

FIG. 7 is a schematic for explaining a specific example of the operation of the mirror apparatus. FIG. 7 illustrates a specific example of an image projected on the projection plate WS.

In the example illustrated in FIG. 7, the partial region PA(m) is in the transmissive state, and the regions other than the partial region PA(m) are in the reflective state. As a result, the image is projected on the projection plate WS with lack of the image in the region corresponding to the partial region PA(m) of the temperature sensor 10.

The present embodiment changes the time ratio between reflection and transmission of the partial region PA in which the temperature is detected by the temperature sensing element SENS of the temperature sensor 10, depending on the temperature detected by the temperature sensing element SENS. Specifically, one frame period of the display apparatus 2 has a reflection period and a transmission period, and the ratio between the reflection period and the transmission period in each partial region PA is changed depending on the temperature detected in the partial region PA. More specifically, the transmission period in one frame period of the display apparatus 2 is made longer in a region (first region) where the temperature detected in each partial region PA is equal to or higher than a predetermined threshold than in a region (second region) where the temperature detected in each partial region PA is lower than the predetermined threshold. Therefore, the present embodiment can limit the incidence of the sunlight LL on the region where the temperature rises due to the incidence of the sunlight LL and suppress temperature rise in the display apparatus 2 without preventing the lack in the image projected on the projection plate WS from being visually recognized by the user H.

Figure 8:
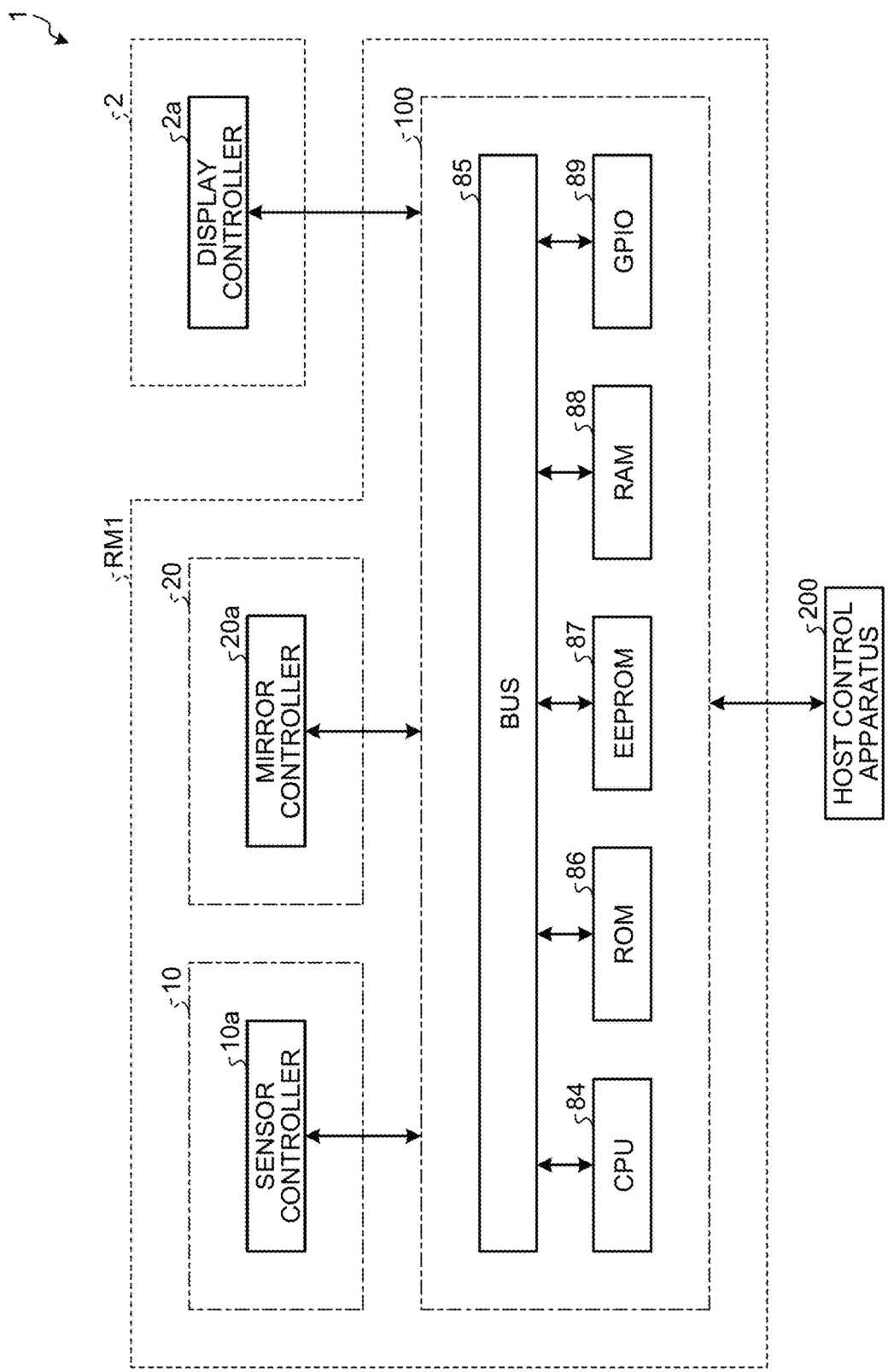
FIG. 8 is a diagram of an example of a control system of the display system according to the embodiment.

FIG. 8 is a diagram of an example of the control system of the display system according to the embodiment. As illustrated in FIG. 8, a control circuit 100 is composed of a control integrated circuit (IC) packaged as what is called a one-chip IC, for example. The control circuit 100 may be composed of a plurality of ICs, for example.

The control circuit 100 communicates with a sensor controller 10a and a mirror controller 20a. The sensor controller 10a controls the temperature sensor 10. The mirror controller 20a controls the liquid crystal mirror 20. The control circuit 100 also communicates with an external host control apparatus 200. The present disclosure is not limited by protocols, interfaces, or the like of the communications of the control circuit 100 with the sensor controller 10a, the mirror controller 20a, and the host control apparatus 200. The control circuit 100 may include some or all of the functions of the sensor controller 10a and the mirror controller 20a, for example.

The control circuit 100 includes a central processing unit (CPU) 84, a bus 85, a read only memory (ROM) 86, an electrically erasable programmable read only memory (EEPROM) 87, a random access memory (RAM) 88, and a general purpose input output (GPIO) 89.

The CPU 84 performs arithmetic operations required to control the mirror apparatus RM1.

The bus 85 functions as a transmission path for various digital signals in the control circuit 100. The CPU 84, the bus 85, the ROM 86, the EEPROM 87, the RAM 88, and the GPIO 89 are coupled to the bus 85.

The ROM 86 stores therein computer programs and other data in a non-rewritable manner. The computer programs and other data refer to software programs read for the processing performed by the CPU 84 and data referred to in the execution of the software programs. The EEPROM 87 stores therein computer programs and other data in a rewritable manner. The RAM 88 temporarily stores therein various data and parameters generated in the execution of the computer programs and other data by the CPU 84.

The GPIO 89 transmits signals to the outside in response to output from the CPU 84 or other components via the bus 85. The GPIO 89 also functions as an input path for inputting, to the bus 85, synchronization signals and other signals received from a display controller 2a that performs display control on the display apparatus 2.

The following describes a specific example of the control of the mirror apparatus RM1 performed by the control system described above.

Figure 9:
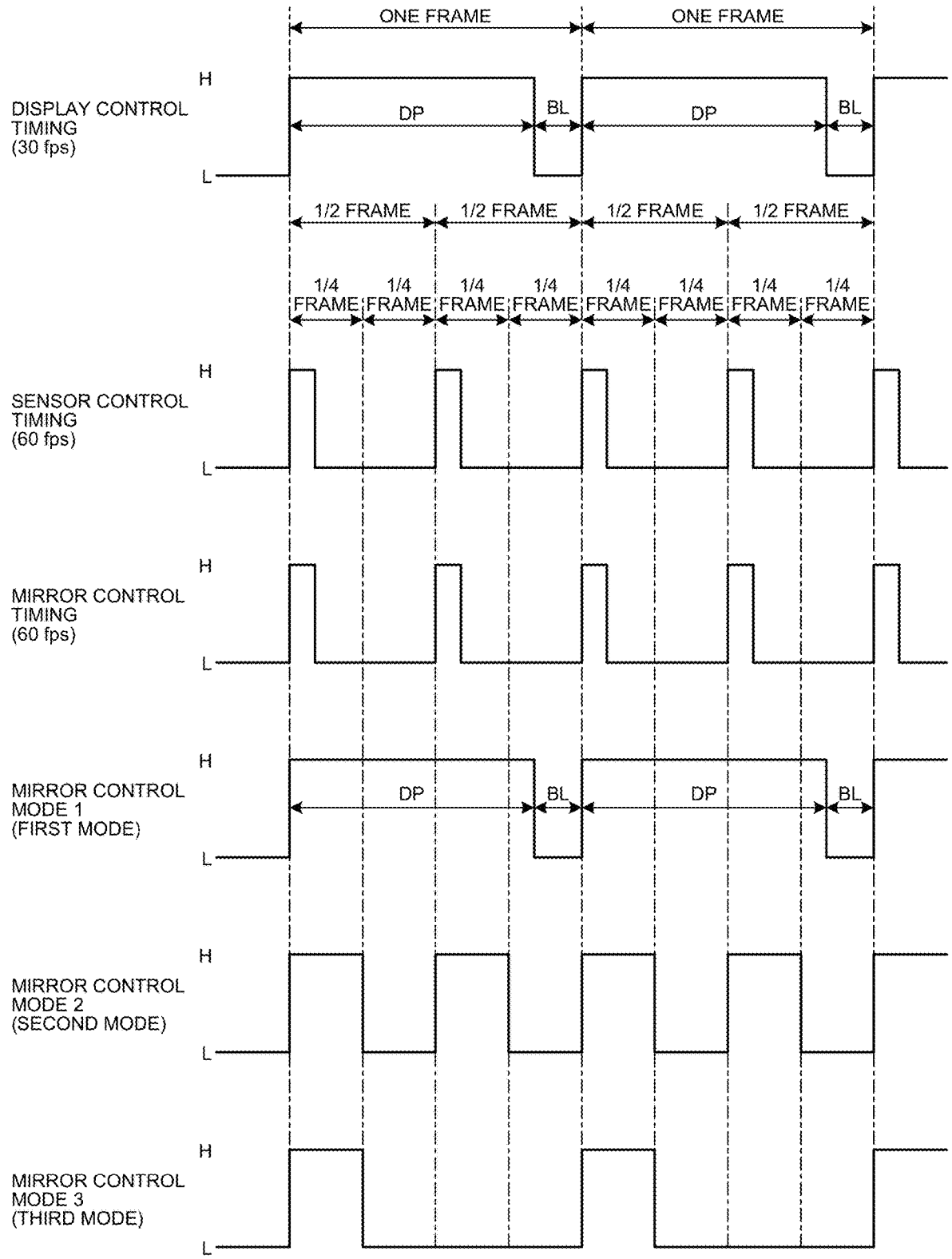
FIG. 9 is a timing chart of an example of control timings of the temperature sensor and the liquid crystal mirror of the mirror apparatus.

The control circuit 100 according to the present disclosure controls the temperature sensor 10 and the liquid crystal mirror 20 of the mirror apparatus RM1 in synchronization with the display frame rate of the display apparatus 2 based on the synchronization signals input from the display controller 2a. FIG. 9 is a timing chart of an example of control timings of the temperature sensor and the liquid crystal mirror of the mirror apparatus.

In the example illustrated in FIG. 9, the "H" period of the display control timing indicates a display period DP, and the "L" period indicates a blanking period BL.

The control circuit 100 acquires the temperature in each partial region PA(m) at twice (e.g., 60 fps) the display frame rate (e.g., 30 fps) of the display apparatus 2, for example. Specifically, the control circuit 100 acquires the temperature in each partial region PA(m) in synchronization with a rise from "L" to "H" of the sensor control timing illustrated in FIG. 9.

The control circuit 100 compares the temperature T(m) of each partial region PA(m) acquired at the sensor control timing illustrated in FIG. 9 with a temperature threshold set in advance. The temperature threshold is stored in the ROM 86 or the EEPROM 87 of the control circuit 100, for example. The temperature thresholds according to the present disclosure include a first threshold Tth1 (e.g., and a second threshold Tth2 (e.g., 80° C.) higher than the first threshold Tth1. The temperature sensor 10 according to the present disclosure is provided to the mirror apparatus RM1.

The control circuit 100 performs mirror control setting in each partial region PA(m) based on the results of comparison of the temperature T(m) of each partial region PA(m) with the temperature thresholds. In the following description, the mirror control setting for each partial region PA(m) set by the control circuit 100 is also referred to as a "mirror control mode". In FIG. 9, the "H" period in mirror control modes 1, 2, and 3 indicates the reflection period in which each partial region PA(m) is in the reflective state, and the "L" period indicates the transmission period in which each partial region PA(m) is in the transmissive state.

Specifically, the control circuit 100 sets the mirror control mode to a first mode for a region (first region) where the temperature T(m) of each partial region PA(m) is lower than the first threshold Tth1 (T(m)<Tth1). In the first mode, the partial region PA(m) is operated to repeat the reflective state and the transmissive state at the display frame rate (e.g., 30 fps) of the display apparatus 2. Specifically, as illustrated in FIG. 9, the partial region PA(m) is set to be in the reflective state in the display period DP of the display apparatus 2 and in the transmissive state in the blanking period BL.

The control circuit 100 sets the mirror control mode to a second mode for a region (second region) where the temperature T(m) of each partial region PA(m) is equal to or higher than the first threshold Tth1 (T(m) Tth1) and lower than the second threshold Tth2 (T(m)<Tth2). In the second mode, the partial region PA(m) is operated to repeat the reflective state and the transmissive state at twice (e.g., 60 fps) the display frame rate (e.g., 30 fps) of the display apparatus 2. Specifically, as illustrated in FIG. 9, the partial region PA(m) is set to repeat the reflective state and the transmissive state every 1/4 frame.

The control circuit 100 sets the mirror control mode to a third mode for a region (third region) where the temperature T(m) of each partial region PA(m) is equal to or higher than the second threshold Tth2. In the third mode, the partial region PA(m) is operated to repeat the reflective state and the transmissive state at the display frame rate (e.g., 30 fps) of the display apparatus 2 such that the transmission period is longer than in the first mode. Specifically, as illustrated in FIG. 9, the partial region PA(m) is set to be in the reflective state in the first 1/4 frame period of one frame period and in the transmissive state in the latter 3/4 frame period. Therefore, the transmission period (3/4 frame period) in one frame period of the region (third region) set to the third mode is longer than the total transmission period (1/2 frame period) in one frame period of the region (second region) set to the second mode.

The control circuit 100 applies the mirror control mode for each partial region PA(m) at twice (e.g., 60 fps) the display frame rate (e.g., 30 fps) of the display apparatus 2, for example. Specifically, the control circuit 100 applies the mirror control mode for each partial region PA(m) in synchronization with a rise from "L" to "H" of the mirror control timing illustrated in FIG. 9.

In the region (first region) where the mirror control mode is the first mode, the partial region PA(m) is in the transmissive state in the blanking period BL of the display apparatus 2. Therefore, the incidence of the sunlight LL is more limited than in the case where the partial region PA(m) is always in the reflective state, and temperature rise in the display apparatus 2 can be suppressed.

In the region (second region) where the mirror control mode is the second mode, the transmission period in which the partial region PA(m) is in the transmissive state in one frame period is longer than in the first mode. Therefore, the incidence of the sunlight LL is more limited than in the case where the partial region PA(m) is operated in the first mode, and temperature rise in the display apparatus 2 can be suppressed.

In the region (third region) where the mirror control mode is the third mode, the transmission period in which the partial region PA(m) is in the transmissive state in one frame period is longer than in the second mode. Therefore, the incidence of the sunlight LL is more limited than in the case where the partial region PA(m) is operated in the second mode, and temperature rise in the display apparatus 2 can be suppressed.

Figure 10:
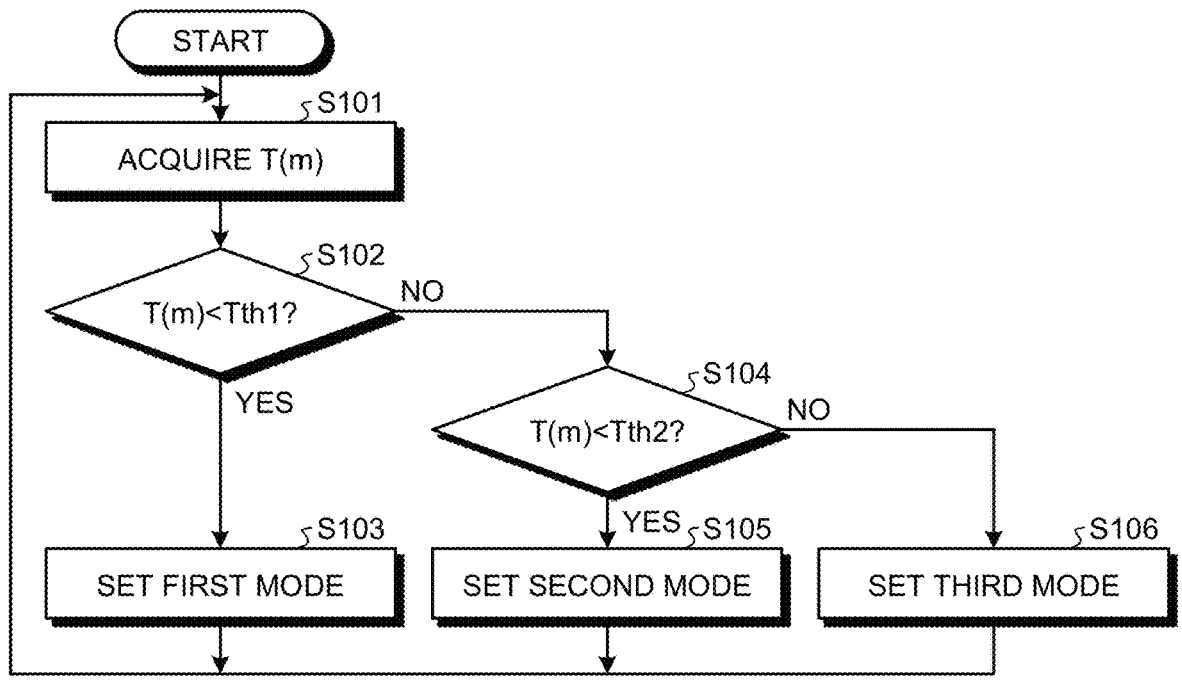
FIG. 10 is a flowchart of an example of a mirror control mode setting process.
Figure 11:
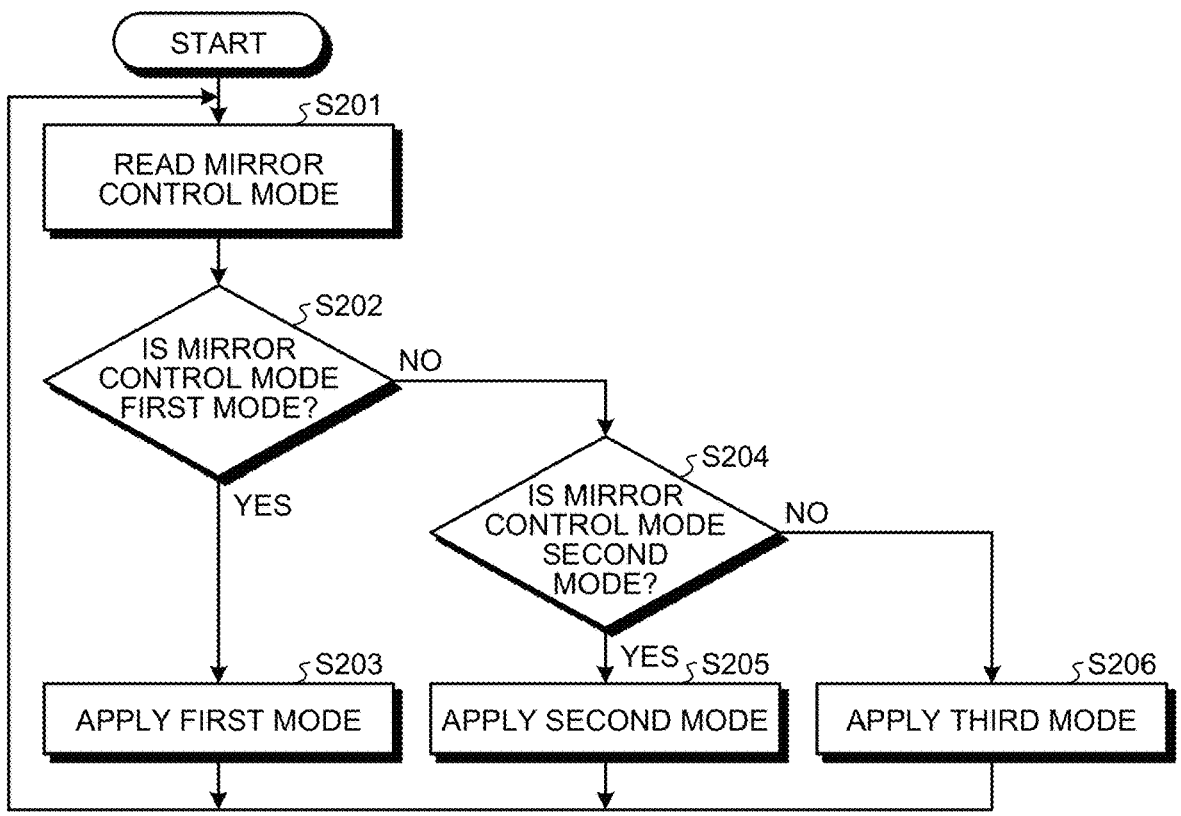
FIG. 11 is a flowchart of an example of a mirror control mode application process.

The following describes the specific processing performed by the mirror apparatus RM1 with reference to FIGS. 10 and 11. FIG. 10 is a flowchart of an example of a mirror control mode setting process. FIG. 11 is a flowchart of an example of a mirror control mode application process.

First, the mirror control mode setting process is described. The control circuit 100 acquires the temperature T(m) in each partial region PA(m) at the sensor control timing illustrated in FIG. 9 (Step S101).

The control circuit 100 compares the temperature T(m) of the partial region PA(m) acquired at Step S101 with the threshold set in advance.

Specifically, for example, the control circuit 100 determines whether the temperature T(m) of the partial region PA(m) is lower than the first threshold Tth1 (e.g., 60° C.) (T(m)<Tth1) (Step S102).

If the temperature T(m) of the partial region PA(m) is lower than the first threshold Tth1 (T(m)<Tth1) (Yes at Step S102), the control circuit 100 sets the mirror control mode for the partial region PA(m) to the first mode (Step S103). At this time, the control circuit 100 temporarily stores, in the RAM 88 of the control circuit 100, a set value set to cause the partial region PA(m) to operate in the first mode, for example.

If the temperature T(m) of the partial region PA(m) is equal to or higher than the first threshold Tth1 (T(m) Tth1) (No at Step S102), the control circuit 100 determines whether the temperature T(m) of the partial region PA(m) is lower than the second threshold Tth2 (e.g., 80° C.) (T(m) <Tth2) (Step S104).

If the temperature T(m) of the partial region PA(m) is lower than the second threshold Tth2 (T(m)<Tth2) (Yes at Step S104), the control circuit 100 sets the mirror control mode for the partial region PA(m) to the second mode (Step S105). At this time, the control circuit 100 temporarily stores, in the RAM 88 of the control circuit 100, a set value set to cause the partial region PA(m) to operate in the second mode, for example.

If the temperature T(m) of the partial region PA(m) is equal to or higher than the second threshold Tth2 (T(m) Tth2) (No at Step S104), the control circuit 100 sets the mirror control mode for the partial region PA(m) to the third mode (Step S106). At this time, the control circuit 100 temporarily stores, in the RAM 88 of the control circuit 100, a set value set to cause the partial region PA(m) to operate in the third mode, for example.

The mirror control mode setting process illustrated in FIG. 10 may be performed in parallel or sequentially for the partial regions PA(m).

Next, the mirror control mode application process is described. The control circuit 100 reads the set value of the mirror control mode for each partial region PA(m) temporarily stored in the RAM 88 in the mirror control mode setting process illustrated in FIG. 10 (Step S201).

The control circuit 100 determines whether the set value of the mirror control mode for the partial region PA(m) is the first mode (Step S202).

If the set value of the mirror control mode for the partial region PA(m) is the first mode (Yes at Step S202), the control circuit 100 applies the first mode as the mirror control mode for the partial region PA(m) (Step S203).

If the set value of the mirror control mode for the partial region PA(m) is not the first mode (No at Step S202), the control circuit 100 determines whether the set value of the mirror control mode for the partial region PA(m) is the second mode (Step S204).

If the set value of the mirror control mode for the partial region PA(m) is the second mode (Yes at Step S204), the control circuit 100 applies the second mode as the mirror control mode for the partial region PA(m) (Step S205).

If the set value of the mirror control mode for the partial region PA(m) is not the second mode (No at Step S204), the control circuit 100 applies the third mode as the mirror control mode for the partial region PA(m) (Step S206).

The mirror control mode application process illustrated in FIG. 11 may be performed in parallel or sequentially for the partial regions PA(m).

By repeatedly performing the mirror control mode setting process (FIG. 10) and the mirror control mode application process (FIG. 11) described above at the sensor control timing illustrated in FIG. 9, specifically, at a frequency of twice (e.g., 60 fps) the display frame rate (e.g., 30 fps) of the display apparatus 2, the incidence of the sunlight LL on the display apparatus 2 is limited, and temperature rise in the display apparatus 2 can be suppressed.

While the control circuit 100 according to the embodiment described above acquires the temperature in each partial region PA(m) at twice (e.g., 60 fps) the display frame rate (e.g., 30 fps) of the display apparatus 2, for example, the sensor control timing is not limited thereto. Specifically, the temperature of the control circuit 100, the sensor controller 10a, and/or the mirror controller 20a may possibly rise due to the incidence of the sunlight LL, for example. If there is a partial region PA(m) in which the temperature T(m) is equal to or higher than the second threshold Tth2, for example, the control circuit 100 may acquire the temperature in each partial region PA(m) at the display frame rate (e.g., 30 fps) of the display apparatus 2. This configuration enables the control circuit 100, the sensor controller 10a, and the mirror controller 20a to consume less power, whereby self-heating of the control circuit 100, the sensor controller 10a, and the mirror controller 20a is suppressed, and temperature rise can be suppressed.

As described above, the display system 1 according to the embodiment of the present disclosure employs, in the optical system RM, the mirror apparatus RM1 including the temperature sensor 10 and the liquid crystal mirror 20. The display system 1 makes the transmission period in one frame period of the display apparatus 2 longer in the region where the temperature detected in each partial region PA is equal to or higher than a predetermined threshold than in the region where the temperature detected in each partial region PA is lower than the predetermined threshold. With this configuration, the display system 1 can limit the incidence of the sunlight LL on the display apparatus 2 and suppress partial temperature rise in the display region of the display apparatus 2.

In the display system 1 according to the embodiment, the sunlight LL transmitted through the liquid crystal mirror 20 is absorbed by the absorption layer 40 provided on the back side of the mirror apparatus RM1 and is dissipated by the heat dissipation layer 50. Therefore, the display system 1 can suppress temperature rise in the liquid crystal mirror 20.

In the display system 1 according to the embodiment, the mirror apparatus RM1 including the temperature sensor 10 and the liquid crystal mirror 20 is incorporated in the optical system RM of the existing display system (HUD). Therefore, the display system 1 can deal with temperature rise in the display panel without incorporating a sensor that detects the temperature of the display panel in the display apparatus.

The components according to the embodiment described above can be appropriately combined. Other action effects provided by the modes described in the present embodiment that are obvious from description of the present specification or at which those skilled in the art can appropriately arrive should naturally be interpreted to be provided by the present disclosure.

What is claimed is:
1. A display system comprising:
a display apparatus; and a mirror apparatus configured to reflect an image from the display apparatus and project the image on a projection plate, wherein the mirror apparatus includes:

a region configured to reflect the image and divided into a plurality of partial regions;

a temperature sensor configured to detect a temperature of each of the partial regions;

a liquid crystal mirror disposed facing the temperature sensor and configured to be switched between a reflective state in which incident light is reflected and a transmissive state in which incident light is transmitted; and a control circuit configured to control the reflective state and the transmissive state in each of the partial regions depending on the temperature detected in the corresponding partial region.

2. The display system according to claim 1, wherein the control circuit controls a ratio between a reflection period and a transmission period of the light in each of the partial regions in one frame period of the display apparatus.

3. The display system according to claim 2, wherein the control circuit makes the transmission period longer in a first region where the detected temperature is equal to or higher than a predetermined threshold than in a second region where the detected temperature is lower than the predetermined threshold.

4. The display system according to claim 2, wherein the control circuit sets the reflection period to a display period of the display apparatus and sets the transmission period to a blanking period of the display apparatus, in a first region where the detected temperature is lower than a first threshold.

5. The display system according to claim 4, wherein the control circuit performs control to repeat the reflection period and the transmission period at twice a display frame rate of the display apparatus, in a second region where the detected temperature is equal to or higher than the first threshold and lower than a second threshold higher than the first threshold.

6. The display system according to claim 5, wherein the control circuit repeats the reflection period and the transmission period at the display frame rate of the display apparatus and makes the transmission period longer than in the first region, in a third region where the detected temperature is equal to or higher than the second threshold.

7. The display system according to claim 6, wherein the transmission period of the third region in one frame period of the display apparatus is longer than a total transmission period of the second region in one frame period of the display apparatus.

8. The display system according to claim 1, wherein the mirror apparatus includes an absorption layer for the light on a back side of a surface on which the light is incident.

9. The display system according to claim 8, wherein the mirror apparatus includes a heat dissipation layer on a back side of the absorption layer.

\* \* \* \* \*